United States Patent [19]

Chevalier

[11] 3,866,029

[45] Feb. 11, 1975

[54] TWO LEVEL RANDOM NUMBER GENERATOR HAVING A CONTROLLABLE EXPECTED VALUE

[75] Inventor: Paul Chevalier, Montreal, Quebec, Canada

[73] Assignee: Prayfel Inc., West Montreal, Quebec, Canada

[22] Filed: Sept. 18, 1973

[21] Appl. No.: 398,409

[52] U.S. Cl. .................................. 235/152, 331/78

[51] Int. Cl. ............................................. G06f 7/60

[58] Field of Search ............... 235/152, 156; 331/78

[56] References Cited

UNITED STATES PATENTS

| | | | |
|---|---|---|---|
| 3,521,185 | 7/1970 | Ley | 331/78 |
| 3,582,882 | 6/1971 | Titcomb et al. | 331/78 X |
| 3,614,399 | 10/1971 | Linz | 235/152 |
| 3,746,847 | 7/1973 | Maritsas | 331/78 X |
| 3,790,768 | 2/1974 | Chevalier et al. | 331/78 X |

*Primary Examiner*—Malcolm A. Morrison
*Assistant Examiner*—David H. Malzahn

[57] ABSTRACT

A random number generator for generating a sequence of binary random numbers ($S_i$) whose expected value is controlled by an input digital number $x$. The random number generator includes a random bit generator which generates at one output a sequence of mutually independent random variables ($RB_i$) such that the probability $P(RB_i{=}0) = P(RB_i{=}1) = ½$. Means are further provided to sequentially analyze the sequence of random variables ($RB_i$) and generate a random variable $L_i$ which has a probability function given by $P(L_i{=}k) = 2^{-k}$ where $k = 1, 2, 3 \ldots$ each time a pattern of the form (1000 . . . 01) containing ($k - 1$) zero is detected. Means are further provided to set the output random variable $S_i$ of the random number generator equal to the bit $X_k$ of $x$ whenever the random variable $L_i$ is equal to $k$, and this for $k = 1, 2, 3 \ldots$.

6 Claims, 1 Drawing Figure

PATENTED FEB 11 1975 3,866,029
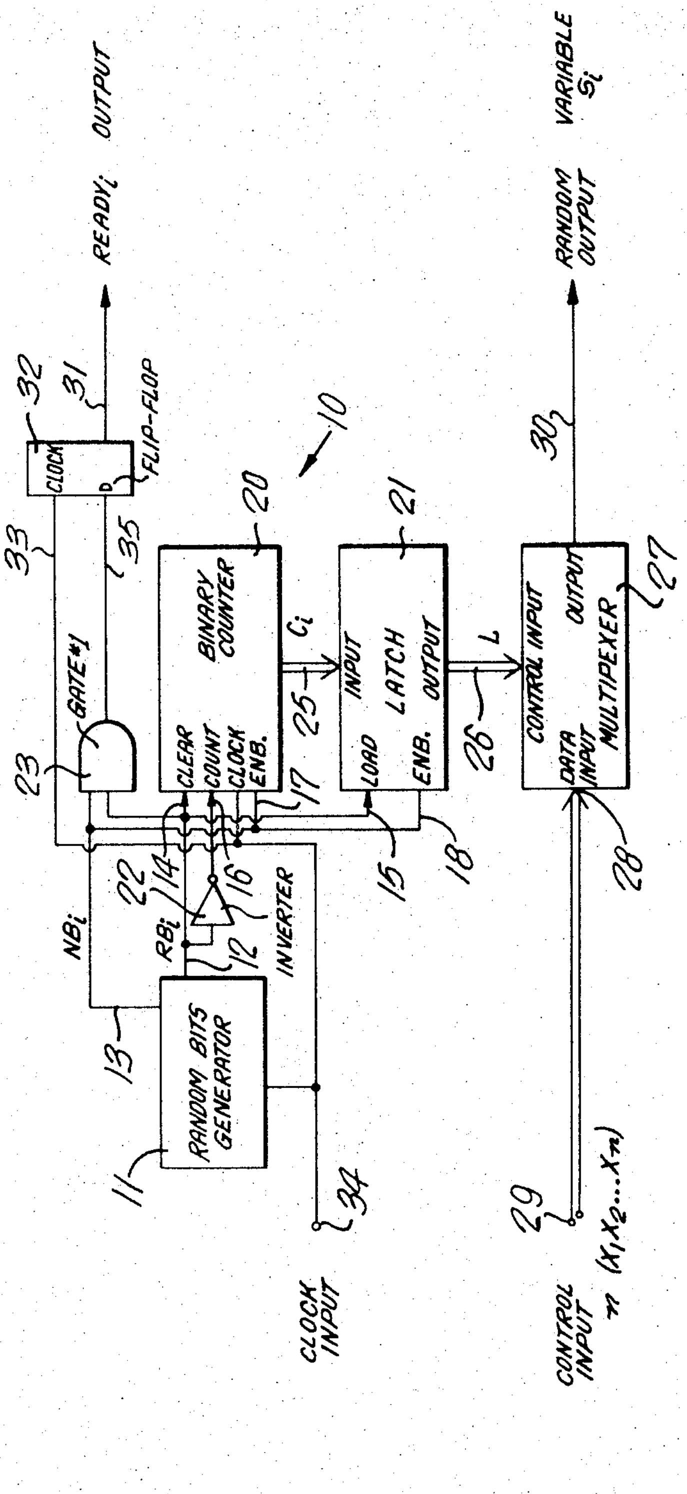

TWO LEVEL RANDOM NUMBER GENERATOR HAVING A CONTROLLABLE EXPECTED VALUE

BACKGROUND OF INVENTION

1. Field of the Invention

The present invention relates to a two level random number generator of which the expected value of its output random numbers is controlled by an input digital number.

Moreover, the output random numbers are generated in accordance with a sequence controlled by a clock signal and each random number generated is independent of the previous ones.

2. Description of Prior Art

There is heretofore known one type of random number generator or sometimes referred to as a digital stochastic converter which from a theoretical point of view has some similarities with the generator of the present invention. With particular reference to a known digital stochastic converter, and namely as described by Mr. B. Gaines in a book, entitled "Advances in Information Systems Sciences"; Thou Vol. 2; Plenum Press (1969) chapter 2 at pp 94–95. This prior art can be summarized mathematically as follows. Let $(A_i)$be a set of mutually independent random variables such that $P(A_i=0) = P(A_i=1) = ½$ and let the output $X$ of the digital stochastic converter be defined by the Boolean equation:

$$X=X_1\cdot(A_1) + X_2\cdot(\overline{A_1}\cdot A_2) + X_3\cdot(\overline{A_1}\cdot A_2\cdot A_3)+ \ldots$$

where $X_k$ is the bit $k$ of the input digital number $x$. Then, it can be shown that the expected value of $X$ is equal to $x$.

There are two major drawbacks in this type of digital stochastic converter and these are derived from the fact that it uses parallel processing. First, it needs an array of parallel gates and then the complexity of this converter grows with the length of the digital word $x$. Second, if the successive outputs X have to be independent, it is necessary to generate a new set of n random variables $(A_i)_{i=1}^{n}$ for each output X generated.

SUMMARY OF INVENTION

A feature of the present invention over the prior art converter mentioned above is derived from the fact that it utilizes a sequential processing such that the hardware implementation does not grow with the length of the input word $x$. Another important feature of the present invention is that in the average, it uses only two random bits for each independent output generated.

Accordingly, from a broad aspect, the present invention provides a random number generator for generating a sequence of binary random numbers $(S_i)$ whose expected value is controlled by an input digital number $x$. The random number generator includes a random bit generator which generates at one output a sequence of mutually independent random variables $(RB_i)$ such that the probability $P(RB_i=0) = P(RB_i=1) = ½$. Means are further provided to sequentially analyze the sequence of random variables $(RB_i)$ and generate a random variable $L_i$ which has a probablity function given by $P(L_i=k) = 2^{-k}$ where $k = 1, 2, 3 \ldots$ each time a pattern of the form (1,000 . . . 01) containing $(k-1)$ zero is detected. Means are further provided to set the output random variable $S_i$ of the random number generator equal to the bit $X_k$ of $x$ whenever the random variable $L_i$ is equal to $k$, and this for $k = 1, 2, 3 \ldots$.

BRIEF DESCRIPTION OF DRAWINGS

The drawing is a block diagram of the two level random number generator of the present invention.

DESCRIPTION OF PREFERRED EMBODIMENTS

Referring to the drawing, there is shown, generally at 10, the random number generator of the present invention and comprising a synchronized random bit generator 11, for example such as described in copending application Ser. No. 292,861 filed Sept. 28, 1972 in the name of Paul Chevalier et al., issued on Feb. 5, 1974, as U.S. Pat. No. 3,790,768 and which gives at one output 12 a sequence of mutually independent random variables $(RB_i)$ such that the probability of $P(RB_i=0) = P(RB_i=1) = ½$ and at another output 13 a flag bit signal $(NB_i)$ which accounts for the fact that in some random bit generators there is not a new independent random bit generated at each clock pulse, in which case $(NB_i)$ is clear. In U.S. Pat. No. 3,790,768, the flag bit signal $NB_i$ and the random variable $RB_i$ are respectively given by the READY OUTPUT and the R.N. OUTPUT described on FIG. 1. In the instant application, the R.N. OUTPUT is a one bit random number as disclosed in claim 11 of the above mentioned patent.

The output 12 $(RB_i)$ of the generator 11 is fed to the "CLEAR" input 14 of a binary counter 20, to the "LOAD" input 15 of a latch memory circuit 21 and to the "COUNT" input 16 of the binary counter 20 through an inverter 22. The output 13 $(NB_i)$ is fed to a gate 23, to the "ENABLE" input 17 of the binary counter 20 and to the ENABLE input 18 of the latch circuit. In this manner, all the processing is inhibited if a new independent random bit $(RB_i)$ has not been generated ($NB_i=0$ in this case). From this, it can be seen that:

1. the content of the counter 20, after a clock pulse $C_{i+1}$, is:

$C_{i+1} = C_i$ if $(NB_i) = 0$ $C_{i+1} = C_i + 1$ if $(NB_i)\cdot(\overline{RB_i}) = 1$ $C_{i+1} = 0$ if $(NB_i)\cdot(RB_i) = 1$ 2. the content of the latch, after a clock pulse $L_{i+1}$, is:

$L_{i+1} = L_i$ if $(\overline{NB_i}) + (\overline{RB_i}) = 1$ $L_{i+1} = C_i$ if $(\overline{NB_i})\cdot(\overline{RB_i}) = 1$ 3. the output $S_{i+1}$ of the converter, after a clock pulse, is: $S_{i+1} = S_i$ if $(NB_i) + (RB_i) = 1$ $S_{i+1} = X_{c_i}$ if $(NB_i)\cdot(RB_i) = 1$ The probability function of the random variable $L_i$ can be evaluated from the above equations.

$$P(L_i = k) = 2^{-(k)}$$

where $k = 1, 2, \ldots$.

Thus the probability that the output $S_i$ of the converter equal the bit $X_k$ of the digital input word is equal to:

$$P(S_i = X_k) = 2^{-k}$$

If the bit $X_k$ of the word $x$ has a weight $2^{-K}$, it is then very easy to show that the expected value of the output random variable $S_i$ is equal to $x$.

With further reference now to the drawing, the output 25 is the content of the counter 20 represented by a four bit binary word $C_i$ and is fed the data input 26 of the latch circuit 21. The binary word $C_i$ is stored in the latch circuit memory on the rising edge of the signal $RB_i$ at output 12 of generator 11. This occurs only when $NB_i = 1$ and the binary word $C_i$ now appears at the output 26 of the latch circuit and is herein represented as $L_i$. At this time, it is pointed out that the clock has now advanced one step.

The output $L_i$ is connected to the control input of a multiplexer circuit 27. The data input 28 of the multiplexer 27 is fed by a digital binary number 29 which is the controlling input of the converter 10. Depending on the value of the four bit binary word $L_i$, the output signal $S_i$ on the output 30 is made equal to a particular bit in the input binary number 29. More particularly $S_i = X_L$ . That is to say, the particular value of $L_i$ corresponds to a particular binary position in the input binary word 29.

A second output signal is provided at the output 31 of a flip-flop 32 which is connected at its clock input 33 to the input clock signal 34 of the converter 10. The clock signal 34 also feeds the generator 11 and the counter 20. The D input 35 of the flip-flop 32 is connected to the output of the gate 23. The output signal 31 provides an indication that a new output variable $S_i$ has been generated and that $S_i$ is independent of the previous random variable $S_{i-1}$.

It is within the ambit of the present invention to have the control input of the multiplexer fed directly by the output $C_i$ of the counter. The output of the multiplexer is then fed to the data input of a one bit latch memory circuit and the output $S_i$ of the random number generator is generated at the output of the one bit latch memory circuit. The LOAD and ENABLE input of the one bit latch memory circuit would be connected in the same manner as the circuit 21 shown in the drawing.

I claim:

1. A random number generator for generating a sequence of binary random numbers ($S_i$) whose expected value is controlled by an input digital number $x$, comprising:

a random bit generator which generates at one output a sequence of mutually independent random variables ($RB_i$) such that the probability $P(RB_i=0) = P(RB_i=1) = ½$, means to sequentially analyse the sequence of random variables ($RB_i$) and generate a random variable $L_i$ which has a probability function given by:

$$P(L_i = k) = 2^{-k} \text{ where } k = 1, 2, 3 \ldots$$

each time a pattern of the form ( 1,000 . . . 01) containing (k-1) zero is detected, and means to set the output random variable $S_i$ of said random number generator equal to the bit $X_k$ of $x$ whenever the random variable $L_i$ is equal to $k$, and this for $k = 1, 2, 3, \ldots$.

2. A random number generator as claimed in claim 1 in which there is further provided a second output to indicate if the random variable $S_i$ at the output of the random number generator is independent of the previous random variable $S_{i-1}$.

3. A random number generator as claimed in claim 1 wherein said random bit generator has a flag bit signal ($NB_i$) at another output which indicates if the bit ($RB_i$) at its said one output is independent of the previous bit $RB_{i-1}$; said flag signal being utilized to inhibit the sequential processing when it is clear.

4. A random number generator as claimed in claim 1 wherein said means to sequentially analyse the sequence ($RB_i$) is a latch memory circuit fed by a counter, the counter being clear when said bit ($RB_i$) = 1 and incremented by one when said bit ($RB_i$) = 0, said latch memory circuit being loaded with the contents of said counter when said bit ($RB_i$) = 1 and disabled when said bit ($RB_i$) = 0.

5. A random number generator as claimed in claim 1 wherein the said means to set the output variable $S_i$ equal to the bit $X_k$ of $x$ is a multiplexer circuit controlled by the output $L_i$ of a latch memory circuit, said multiplexer having a data input fed by the bits of the word $x$.

6. A random number generator as claimed in claim 1 wherein said means to sequentially analyse the sequence ($RB_i$) is a counter which is cleared when ($RB_i$) = 1 and incremented by one when ($RB_i$) = 0, a latch memory circuit is connected to the output of a multiplexer circuit to generate the random variable $S_i$ when $RB_i$ becomes equal to 1.

* * * * *